(12) United States Patent
Adibhatla

(10) Patent No.: US 6,539,783 B1
(45) Date of Patent: Apr. 1, 2003

(54) METHODS AND APPARATUS FOR ESTIMATING ENGINE HEALTH

(75) Inventor: Sridhar Adibhatla, West Chester, OH (US)

(73) Assignee: General Electric Co., Schenectady, NY (US)

( * ) Notice: Subject to any disclaimer, the term of this patent is extended or adjusted under 35 U.S.C. 154(b) by 0 days.

(21) Appl. No.: 09/221,399

(22) Filed: Dec. 28, 1998

(51) Int. Cl.⁷ .............................................. G01M 19/00
(52) U.S. Cl. ...................................................... 73/118.1
(58) Field of Search ............................... 73/116, 117.2, 73/117.3, 118.1, 115, 119 A

(56) References Cited

U.S. PATENT DOCUMENTS

| | | | |
|---|---|---|---|
| 4,215,412 A | * 7/1980 | Bernier et al. | 73/116 |
| 5,080,496 A | 1/1992 | Keim et al. | 374/144 |
| 5,489,829 A | 2/1996 | Umida | 318/561 |
| 5,689,066 A | * 11/1997 | Stevenson | 73/117.2 |
| 5,726,891 A | * 3/1998 | Sisson et al. | 73/117.3 |

FOREIGN PATENT DOCUMENTS

| | | | |
|---|---|---|---|
| GB | 858017 A2 | 8/1998 | |
| GB | 0858017 A2 | * 8/1998 | G05B/23/02 |

* cited by examiner

*Primary Examiner*—Eric S. McCall
*Assistant Examiner*—Maurice Stevens
(74) *Attorney, Agent, or Firm*—Nathan D. Herkamp; Armstrong Teasdale LLP; Robert B. Reeser, III

(57) ABSTRACT

An engine tracking filter system that obtains information from two or more operating conditions to estimate health parameters P, performance parameters $Y_p$, and sensor estimates $Y_s$, is described. Such multipoint estimation of engine health enables estimation of all engine health parameters rather than only a few engine health parameters for use in engine component diagnostics, trending, and fault detection and isolation. In addition, such estimation is believed to provide improved estimates of sensed parameters for use in sensor redundancy management and sensor elimination, and also is believed to provide improved estimates of performance parameters for use in model based control to reduce required temperature, stall, and other margins.

16 Claims, 2 Drawing Sheets

METHODS AND APPARATUS FOR ESTIMATING ENGINE HEALTH

The invention herein described was made in the performance of work under Air Force Contract F33615-94-C2428.

BACKGROUND OF THE INVENTION

This invention relates generally to aircraft engines and more particularly, to a multipoint engine model and tracking filter for estimating engine health.

Engine components typically are scheduled for maintenance based on a preselected number of operation hours or cycles. The preselected number typically is conservatively selected based on numerous factors including past component experience. If a component fails, a predetermined diagnosis routine is followed to identify and replace the failed component.

To estimate engine health, it is customary to model values such as engine efficiency and engine corrected flow. These modeled characteristics, however, are based on a nominal or average new engine. Due to manufacturing tolerances, faults, damage, or deterioration with time, actual engine characteristics typically are different from the assumed nominal characteristics.

Rather than simply performing maintenance based on a preselected number of operation hours or cycles, or modeling engine performance based on a nominal new engine, it would be desirable to track deterioration of the actual engine components over time. Algorithms for tracking engine health are sometimes referred to herein as tracking filters, sand such tracking filters provide "health estimates" of engine components.

Health estimates can be used to facilitate "on condition" maintenance rather than maintenance based on a number of hours or cycles. Performing maintenance based on actual engine health facilitates eliminating unnecessary maintenance. In addition such tracking facilitates fault diagnosis in that the status of each component would be known and, based on the actual known state of each component, the failed component can be readily identified.

The health estimates also can be used to improve computation of sensed parameters (e.g., rotor speeds, temperatures, and pressures). Specifically, the condition of the components is indicative of such parameters. Health estimates therefore provide sensor redundancy and even the potential to eliminate sensors by using "virtual" sensors. Further, health estimates can be used to improve computation of parameters that are not sensed, such as thrust, turbine inlet temperature, stall margins, and air flows. These parameters can be used by the control logic to, for example, reduce required margins and to improve engine performance.

Known tracking filters do not consider information from more than one operating point simultaneously, and the number of parameters estimated is equal to the number of sensors. Since the number of sensors is usually much smaller than the number of parameters to be estimated, such filters combine the effect of several parameters into a few parameters, which inhibits individually tracking each parameter.

Examples of known filters include steady-state tracking filters, dynamic tracking filters using, for example, Kalman tracking filters, and least-squares estimator filters. Nonlinear estimation filters including neural networks or fuzzy rule-based systems also can be used. Although known filters perform reasonably well when estimating secondary parameters required for model based control, such filters are not well suited for model based diagnostics.

The least-squares tracking filter, for example, solves a system in which the number of observations (sensors) is smaller than the number of unknowns (parameters). However, the least-squares estimate, in general, differs from the actual component characteristics. Specifically, there are fewer sensors than parameters, and the system is not "observable" using sensor data from a single operating condition. To improve engine health filter performance, it would be desirable to increase observability, i.e., increase sensor data.

BRIEF SUMMARY OF THE INVENTION

These and other objects may be attained by a tracking filter system that matches all model parameters to corresponding engine parameters and therefore, the model matches the actual engine. The tracking filter system provides that the model tracks the engine at steady-state as well as dynamically, and does not adversely affect control stability and robustness. More specifically, the present filter obtains information from two or more engine operating conditions to estimate health parameters P, performance parameters $Y_p$, and sensor estimates $Y_s$. The operating condition is defined by a combination of flight conditions and engine power level. The information from each operating point is considered to be linearly independent. The nonlinearily inherent in the engine is therefore leveraged rather than viewed as a problem handled by the control system or estimation scheme.

By collecting sensor data from a multiplicity of linearly independent operating conditions before using the data for parameter estimation, observability is increased because sensor data from n-operating conditions simultaneously is similar to having n times the number of sensors. Therefore, the number of observations (sensors) is greater than the number of unknowns (parameters), which results in good estimates of the parameters, and tolerance to sensor biases.

In one specific implementation, a tracking filter compensation unit is coupled to receive corrected sensor measurements from the engine. The sensor measurements are combined with previously generated model estimates, and the combined sensor measurements and model estimates are provided to the compensation unit. The compensation unit generates filter updates which are supplied to an engine model unit. The engine model unit also receives corrected environmental sensor inputs and control signals from an engine control unit. The engine model unit generates updated model estimates which are then subsequently supplied to the tracking filter compensation unit as described above.

The engine model unit obtains information from two or more operating conditions to estimate health parameters P, performance parameters $Y_p$, and sensor estimates $Y_s$. Using such multipoint estimation of engine health enables estimation of all engine health parameters rather than only a few engine health parameters for use in engine component diagnostics, trending, and fault detection and isolation. In addition, such estimation is believed to provide improved estimates of sensed parameters for use in sensor redundancy management and sensor elimination, and also is believed to provided improved estimates of performance parameters for use in model based control to reduce required temperature, stall, and other margins.

DETAILED DESCRIPTION OF THE INVENTION

Although the present invention is sometimes described herein in the context of tracking health of aircraft engine components, it should be understood that the invention can be used in many other contexts in which it is desirable to track the status of actual (i.e. plant) components as compared to modeling based on a nominal component.

Differences between the model (i.e., nominal engine) and plant (i.e., actual engine) are modeled using tunable parameters. That is, the model is assumed to be structurally correct, and the system identification problem translates to a parameter identification problem. Thus, both the plant and the model are represented as:

$$X\text{dot} = f(X, U_a, U_s, P) \qquad (1)$$

$$[Y_s, Y_p] = g(X, U_a, U_s, P) \qquad (2)$$

where X is a vector of states, and all the states are not measurable. Typically, X=[fan speed, core speed, and one of more metal temperatures]. Fan and core speeds depend on the inertias of the two rotors and are measurable. The metal temperatures representing heat soak, however, are not measurable.

$U_a$ is a vector of actuator positions which are sensed and fed back to the filter. Actuator input to the filter is biased due to errors in the position sensors.

$U_S$ is a vector of environmental inputs, usually fan inlet temperature (T1) and pressure (P1). The engine is exposed to the true temperature T1 and pressure P1. The model inputs, however, are the sensed temperature T1 and pressure P1.

P is a set of parameters that describe the quality of the engine—multipliers and/or adders on component efficiency and flow characteristics, bleeds, power extraction level, clearances, pressure drops, and any other parameter used to characterize how the actual engine differs from a nominal new engine. The model initially has these parameters set to 1.0 for multipliers and 0.0 for adders to represent a nominal new engine. The actual engine has non-unity or non-zero values for the multipliers and adders, respectively, depending upon its manufacturing quality, amount of deterioration with age, and other operational impact.

$Y_S$ is a set of output parameters such as speeds, temperatures, pressures.

$Y_p$ is a set of output parameters that are not sensed such as performance parameters (e.g., thrust, stall margins, airflow) and other temperatures and pressures.

The primary tracking filter objective is to tune the parameters P in the model to match the plant values, and to compute biases in the sensed inputs U, using the biased sensor values Y. A secondary objective is to obtain good estimates of $Y_p$ and $Y_S$, without necessarily correctly estimating the parameters P.

Figure 1:
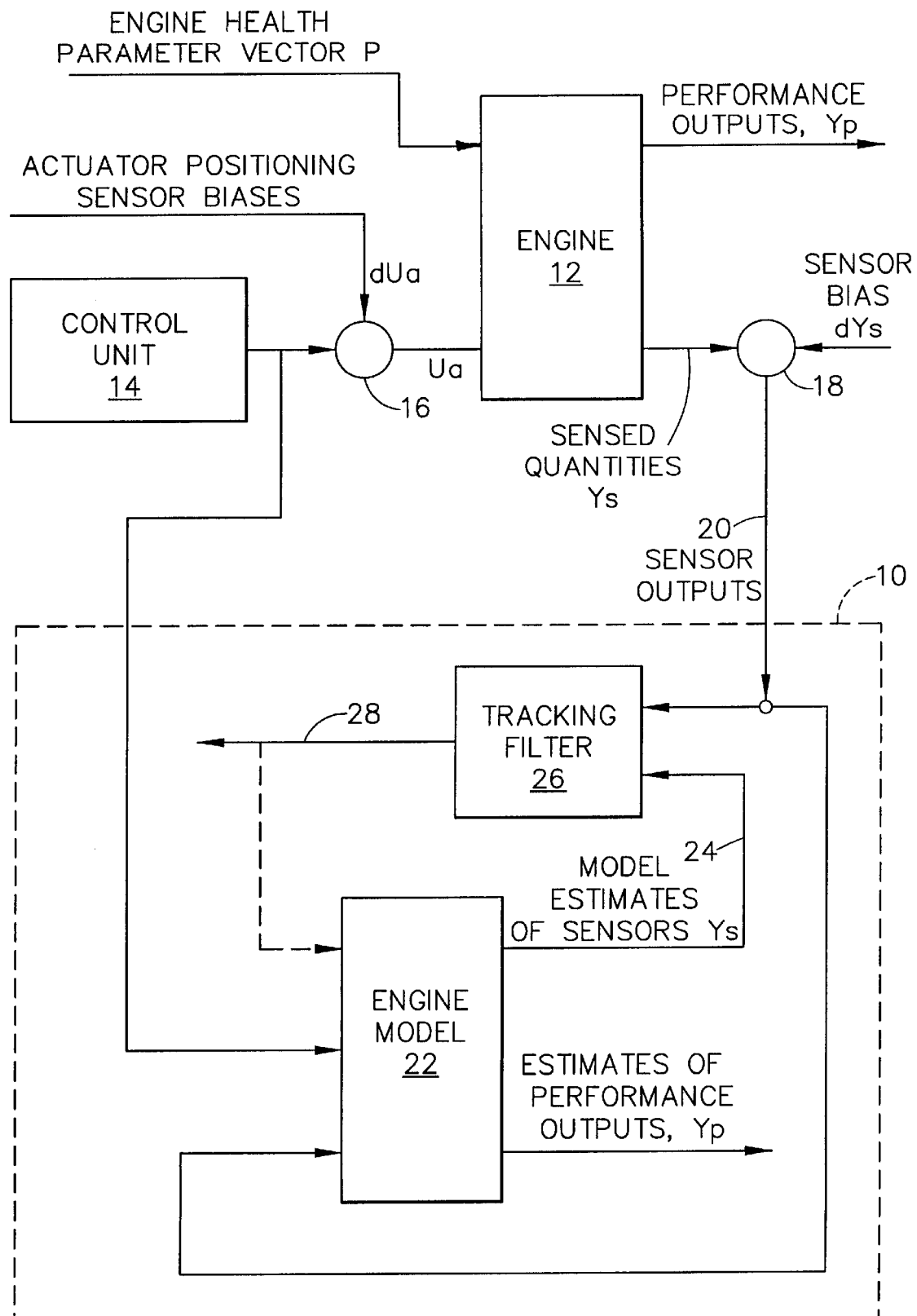
FIG. 1 is a block diagram of an exemplary filter system that matches model parameters to corresponding engine parameters so that the model matches the plant.

A block diagram of a filter system 10 for estimating all parameters (i.e., a filter that matches all model parameters to corresponding engine parameters and therefore, the model matches the plant) is shown in FIG. 1. System 10 could be implemented using, for example, a commercially available processor having the desired processing speed and capacity.

As shown in FIG. 1, an actual engine 12 has components with health parameters represented by a parameter vector P. Engine 12 receives input from a control unit 14, but these inputs are biased 16 due to positioning sensor errors. Engine 12 has performance outputs Yp and sensed quantities Ys. The sensed quantities are biased 18 by sensor biases to produce engine sensor outputs 20.

The output of control unit 14, along with some sensor outputs 20 are used by a model 22 of engine 12 embedded in the engine control system to produce estimates 24 of sensor outputs. A tracking filter 26 uses engine sensor outputs 20 and model sensor estimates 24 to produce estimates 28 of the engine health parameter and actuator and sensor biases. These health parameter estimates can be used for engine diagnostics. Once the health parameter and sensor bias estimates 28 are obtained, these estimates can optionally be fed back (indicated by dashed line) to model 22 or to a different model, to obtain better estimates of performance parameters and sensed values for use in model-based control.

Matching model parameters to corresponding engine parameters is difficult since the number of parameters estimated (e.g., component characteristics, performance variables, sensor biases) is necessarily larger than the number of sensors available on the engine for use in the tracking process.

The present filter for estimating engine health parameters obtains information from two or more operating conditions to estimate health parameters P, performance parameters $Y_p$, and sensor estimates $Y_s$. The operating condition is defined by a combination of flight conditions and engine power level. The information from each operating point is considered to be linearly independent. The nonlinearity inherent in the engine is therefore leveraged rather than viewed as a problem handled by the control system or estimation scheme. By collecting sensor data from a multiplicity of linearly independent operating conditions before using the data for parameter estimation, observability is increased because sensor data from n operating conditions simultaneously is similar to having n times the number of sensors. Therefore, the number of observations (sensors) is greater than the number of unknowns (parameters), which results in good estimates of the parameters, and tolerance to sensor biases.

More specifically, and in accordance with one embodiment of the present invention, the nonlinear system described by equations (1) and (2) above is linearized at a specific operating point (X1, U1):

$$dX\text{dot} = AdX + Bdu \qquad (3)$$

$$dY = CdX + DdU \qquad (4)$$

At steady-state (Xdot=0), these equations can be written as:

$$dY = GdU \qquad (5)$$

where, G is the DC gain matrix from inputs U=[Ua Us P] to outputs Y=[Yp Ys].

A subset of the engine health vector P is pre-selected as the update vector U, and a subset of the available sensors is pre-selected as the vector Y. Techniques for pre-selecting sensors and updates include heuristic schemes (estimate only the most important parameters) and systematic techniques that evaluate several sensor-update combinations, such as described in Adibhatla et al. "Tracking Filter Selection and Control Mode Selection for Model Based Control", AIAA 94-3204, 30$^{th}$ Joint Propulsion Conference, Indianapolis, Ind., Jun. 27–29, 1994.

Equation (5) can be solved as:

$$dU = G^{-1} dY \qquad (6)$$

where $G^{-1}$ is the inverse of the DC gain matrix G if the size of dY is equal to the size of dU (i.e., the number of observations is equal to the number of unknowns) and is the pseudo-inverse of G if the size of dY is smaller than the size of dU (i.e., number of observations is smaller than the number of unknowns).

Linearizing at more than one operating condition provides:

$$dY1 = G1^{-1} dU \qquad (7a)$$

$$dY2 = G2^{-1} dU \qquad (7b)$$

$$\vdots$$

$$dYn = Gn^{-1} dU \qquad (7c)$$

which can be solved using:

$$dU = \operatorname{inv}[G1\ G2\ \ldots\ Gn]^T [dY1\ dY2\ \ldots\ dYn]^T \qquad (8)$$

where the superscript T refers to the transpose of a matrix, and inv [A] refers to the inverse or pseudo-inverse of A, with the number of observations greater than or equal to the number of unknowns.

For the solution set forth above, the rank of $[G1\ G2\ \ldots\ Gn]^T$ should be greater than or equal to the size of the vector dU. That is, the number of linearly independent rows of $[G1\ G2\ \ldots\ Gn]^T$ should be greater than or equal to the size of the vector dU. Therefore, the system must be nonlinear so that the DC gain matrices at different operating points G1, G2 . . . , Gn are different. For most practical systems, and for the engine problem in particular, this assumption is satisfied.

In general, due to the nonlinearity assumed to be present in the system, the elements of the DC gain matrix G are dependent on the step size dP. Therefore, equation (8) is actually a system of nonlinear equations that can be solved iteratively. In this sense, equation (8) is not merely a stacked state-space system wherein linearized models are stacked before solving the resulting set of linear equations.

Figure 2:
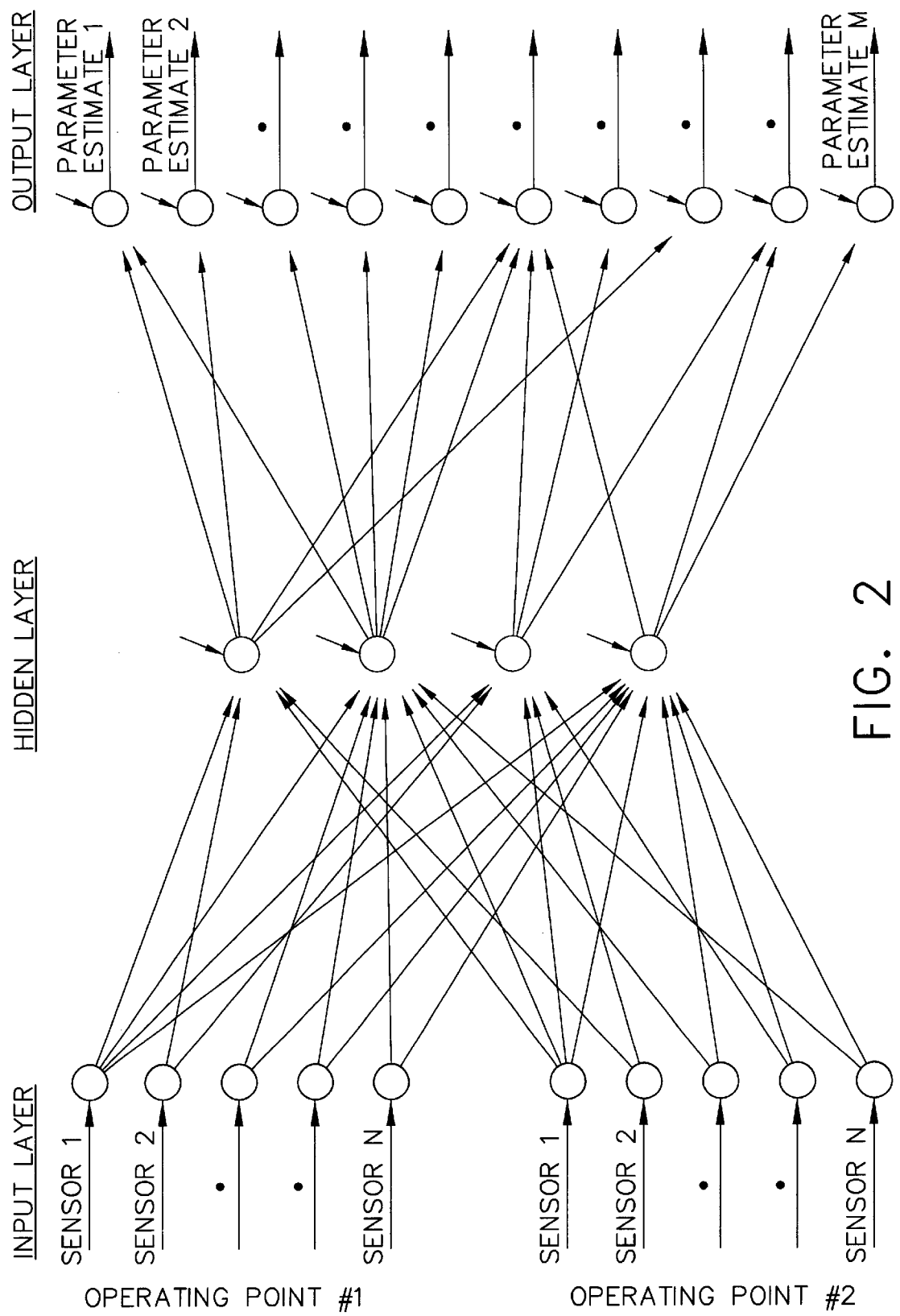
FIG. 2 is a schematic illustration of an exemplary multi-point neural network.

The system, however, does not have to be linearized. In one possible implementation of this technique, and rather than a conventional neural network, a multipoint neural network as shown in FIG. 2 can be used. As shown in FIG. 2, inputs from multiple sensors are obtained at Operating Point #1 and also at Operating Point #2. The sensed quantities from these multiple operating points are supplied to nodes of the neural network and processed to provide parameter estimates. That is, N sensors at $R \geq 2$ operating points are used to estimate M parameters, where $N*R \geq M$. In FIG. 2, of course, not all connections are shown and more than one hidden layer may be used.

In another implementation of this technique, a large number of engines with different health and different sensor biases are simulated at two or more operating conditions, and the resulting values of engine sensor values and model estimates of sensor values are collected. A multiple linear regression analysis is then performed to compute a regressor matrix that correlates the engine sensor values and model estimates of sensor values to estimates of engine health and sensor biases. This can be expressed as:

$$\text{Solve } Y = RX \qquad (9a)$$

where,
  Y=p by n matrix of parameters to be estimated for the simulated engines
  X=(a+b)*r by n matrix of sensor values and sensor estimates
  R=Regressor matrix of size p by (a+b)*r
  p=number of parameters to be estimated
  n=number of engines simulated
  a=number of engine sensor values
  b=number of model estimates of sensor values
  r=number of operating points This equation can be solved to obtain at least squares solution:

$$R = X \backslash Y \text{ (or, } R = \operatorname{pinv}(X)*Y) \qquad (9b)$$

where the backslash operator or pinv refer to the matrix pseudo-inverse. Once the regressor matrix R is computed, it can be used to estimate the health of any engine for which the sensor values and corresponding model estimates of sensor values are collected at r operating points using:

$$y = Rx \qquad (9c)$$

where,
  Y=p×1 vector of parameters to be estimated
  x=(a+b)*r by 1 vector of sensor values and sensor estimates Estimators that use techniques other than multiple linear regression and neural networks can also be used, as long as the input sensor set contains sensor information from more than one operating condition. Estimators using engine sensor values alone, or differences between engine sensor values and model estimates, or corrected sensor inputs, or functions of sensor inputs such as quadratic terms formed by products of sensor values could also be used.

Equations (7) and (8) are based on an assumption that the update vector dU, consisting of the engine health vector dP, and estimates of actuator and inlet sensor errors [dUa dUs], are invariant with operating condition. Generally, the engine health (e.g., quality and deterioration) level is unlikely to change in the time taken to acquire data from two or more operating points. Faults that cause these parameters to change between operating points are assumed to be infrequent and detectable. However, even when the engine health does not change significantly, the parameters that are used to model engine health can change with operating condition.

For example, if one of the health parameters being estimated is turbine efficiency, the corresponding model parameter is an efficiency adder or scale factor. This model parameter will, in general, be a function of operating condition. That is, the difference between efficiency obtained from the turbine map used in the model and the actual turbine map changes with operating conditions. In such a case, it is still possible to obtain good estimates of engine health, by expressing the health parameter as:

$$dP = dP_0 + aX \qquad (10a)$$

or as:

$$dP = dP_0 + aX + bX^2, \qquad (10b)$$

where X is a scheduling variable such as rotor speed.

This increases the dimensionality of the problem, since the estimation of each parameter dP is now replaced by the estimation of two parameters $dP_0$ and a, or three parameters $dP_0$, a, and b. However, this does not change the solution technique, except that sensor data from a larger number of operating points will have to be collected prior to solving for the unknowns. Also, it is possible to use more than one scheduling variable X. Use of more than one scheduling variable X, however, is likely to make the number of unknowns too large and make the solution cumbersome unless done selectively.

In the absence of sensor biases, data from more than one operating condition is collected until the number of observations is greater than or equal to the number of unknowns. To deal with sensor bias, however, it is possible to parameterize the sensor biases and estimate biases as well, not use sensors that are known to have large biases, and/or collect sensor data from a larger number of operating points than is necessary for the unbiased sensor case.

The above described multipoint estimation of engine health enables estimation of all engine health parameter rather than only a few engine health parameters for use in engine component diagnostics, trending, and fault detection and isolation. In addition, such estimation is believed to provide improved estimates of sensed parameters for use in sensor redundancy management and sensor elimination, and also is believed to provided improved estimates of performance parameters for use in model based control to reduce required temperature, stall, and other margins.

From the preceding description of various embodiments of the present invention, it is evident that the objects of the invention are attained. Although the invention has been described and illustrated in detail, it is to be clearly understood that the same is intended by way of illustration and example only and is not to be taken by way of limitation. Accordingly, the spirit and scope of the invention are to be limited only by the terms of the appended claims.

What is claimed is:

1. A method for estimating engine operation parameters, the engine having a plurality of sensors responsive to engine operations, said method comprising the steps of:

obtaining outputs from N sensors when the engine is operating at R operating points, where $R \geq 2$, wherein $N>1$, and wherein each N sensor is responsive to a different engine operation parameter; and generating M engine model estimates including at least one engine parameter that is indicative of the quality of the engine, wherein each engine model estimate is generated by utilizing all of the outputs obtained from the N sensors at R operating points, where $N*R \geq M$.

2. A method in accordance with claim 1 wherein generating M engine model estimates comprises the step of estimating parameters P, performance parameters $Y_p$, and sensor estimates $Y_s$, wherein the parameters P describe the quality of the engine.

3. A method in accordance with claim 1 wherein said step of obtaining outputs further comprises the step of obtaining a first operating point at a first set of flight conditions and a first engine power level.

4. A method in accordance with claim 3 wherein said step of obtaining outputs further comprises the step of obtaining a second operating point at a second set of flight conditions and a second engine power level.

5. A method in accordance with claim 4 wherein said step of obtaining a second operating point further comprises the step of obtaining outputs at the second operation point linearly independently of the first operating point.

6. A method in accordance with claim 1 wherein generating engine model estimates comprises the step of executing at least one of a neural network based algorithm, a least-squares based algorithm, and a fuzzy/rule-based algorithm.

7. Apparatus for estimating engine operation parameters, the engine having a plurality of sensors responsive to engine operations, said apparatus comprising a processor coupled to the engine for receiving input from the sensors, said processor programmed to:

obtain outputs from N sensors when the engine is operating at R operating points, where $R \geq 2$, $N>1$, and wherein each N sensor is responsive to a different engine operation parameter; and generate M engine model estimates including at least one engine parameter that is indicative of the quality of the engine, wherein each engine model estimate is generated by utilizing the outputs obtained from the N sensors at R operating points, where $N*R \geq M$.

8. Apparatus in accordance with claim 7 wherein to generate engine model estimates, said processor is programmed to estimate parameters P, performance parameters $Y_p$, and sensor estimates $Y_s$.

9. Apparatus in accordance with claim 7 wherein a first operating point is defined by a first set of flight conditions and a first engine power level.

10. Apparatus in accordance with claim 9 wherein a second operating point is defined by a second set of flight conditions and a second engine power level.

11. Apparatus in accordance with claim 10 wherein the second operating point is linearly independent of the first operating point.

12. Apparatus in accordance with claim 7 wherein to generate engine model estimates, said processor is programmed to execute at least one of a neural network based algorithm, a least-squares based algorithm, and a fuzzy/rule-based algorithm.

13. Apparatus for estimating operation parameters of an engine, the engine having a plurality of N sensors responsive to engine operations, a control unit for controlling engine operations, and a plurality of environmental sensors for sensing environmental conditions, said apparatus comprising:

a tracking filter compensation unit configured to receive corrected sensor measurements from the engine; and an engine model unit coupled to receive updated data from said tracking filter compensation unit, said engine model unit configured to generate M model estimates including at least one engine parameter that is indicative of the quality of the engine, wherein each engine model estimate is generated by utilizing outputs from the N sensors when the engine is operating at R operating points, where $R \geq 2$, $N>1$, $N*R \geq M$, and wherein each N sensor is responsive to a different engine operation parameter.

14. Apparatus in accordance with claim 13 wherein said engine model unit is coupled to the engine control unit and to the environmental sensors.

15. Apparatus in accordance with claim 13 wherein model estimates generated by said engine model unit are supplied to said tracking filter compensation unit.

16. Apparatus in accordance with claim 13 wherein said engine model unit estimates health parameters P, performance parameters $Y_p$, and sensor estimates $Y_s$.

* * * * *